(12) United States Patent  
Gjerstad et al.

(10) Patent No.: US 7,058,888 B1  
(45) Date of Patent: Jun. 6, 2006

(54) MULTI-MODAL TEXT EDITING CORRECTION

(75) Inventors: Kevin B. Gjerstad, Seattle, WA (US); Yutaka Suzue, Issaquah, WA (US); Yutaka Nakajima, Redmond, WA (US); Benjamin M. Westbrook, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/557,739

(22) Filed: Apr. 25, 2000

(51) Int. Cl.  
*G06F 17/21* (2006.01)

(52) U.S. Cl. .................................... 715/531
(58) Field of Classification Search ............... 715/531, 715/530  
See application file for complete search history.

(56) References Cited

U.S. PATENT DOCUMENTS

| | | | | |
|---|---|---|---|---|
| 5,109,439 A | * | 4/1992 | Froessl | 382/305 |
| 5,157,384 A | * | 10/1992 | Greanias et al. | 345/156 |
| 5,511,193 A | * | 4/1996 | Tung et al. | 709/329 |
| 5,524,193 A | * | 6/1996 | Covington et al. | 715/512 |
| 5,659,769 A | * | 8/1997 | Kida et al. | 715/530 |
| 5,802,534 A | * | 9/1998 | Hatayama et al. | 715/530 |
| 5,946,499 A | * | 8/1999 | Saunders | 710/73 |
| 6,466,240 B1 | * | 10/2002 | Maslov | 715/853 |

OTHER PUBLICATIONS

Isokoski et al., "Quickwriting as a Multi-Device Text Entry Method", published by ACM, Oct. 2004, pp. 105-108.*

* cited by examiner

*Primary Examiner*—Heather R. Herndon  
*Assistant Examiner*—Peter J. Smith  
(74) *Attorney, Agent, or Firm*—Shook, Hardy & Bacon

(57) ABSTRACT

A multi-modal text editing correction environment is disclosed. An application program owns a document, while each of a number of handlers has a corresponding input device and is capable of entering text into the document. Each handler has a method callable by the program to request: that the handler return correction content for display by the application; and/or that the handler display a correction interface. A common text framework includes a mechanism to track entry of text into the document by handler, and a correction interface callable by the application program to determine the handler responsible for entering a particular range of text into the document.

14 Claims, 3 Drawing Sheets

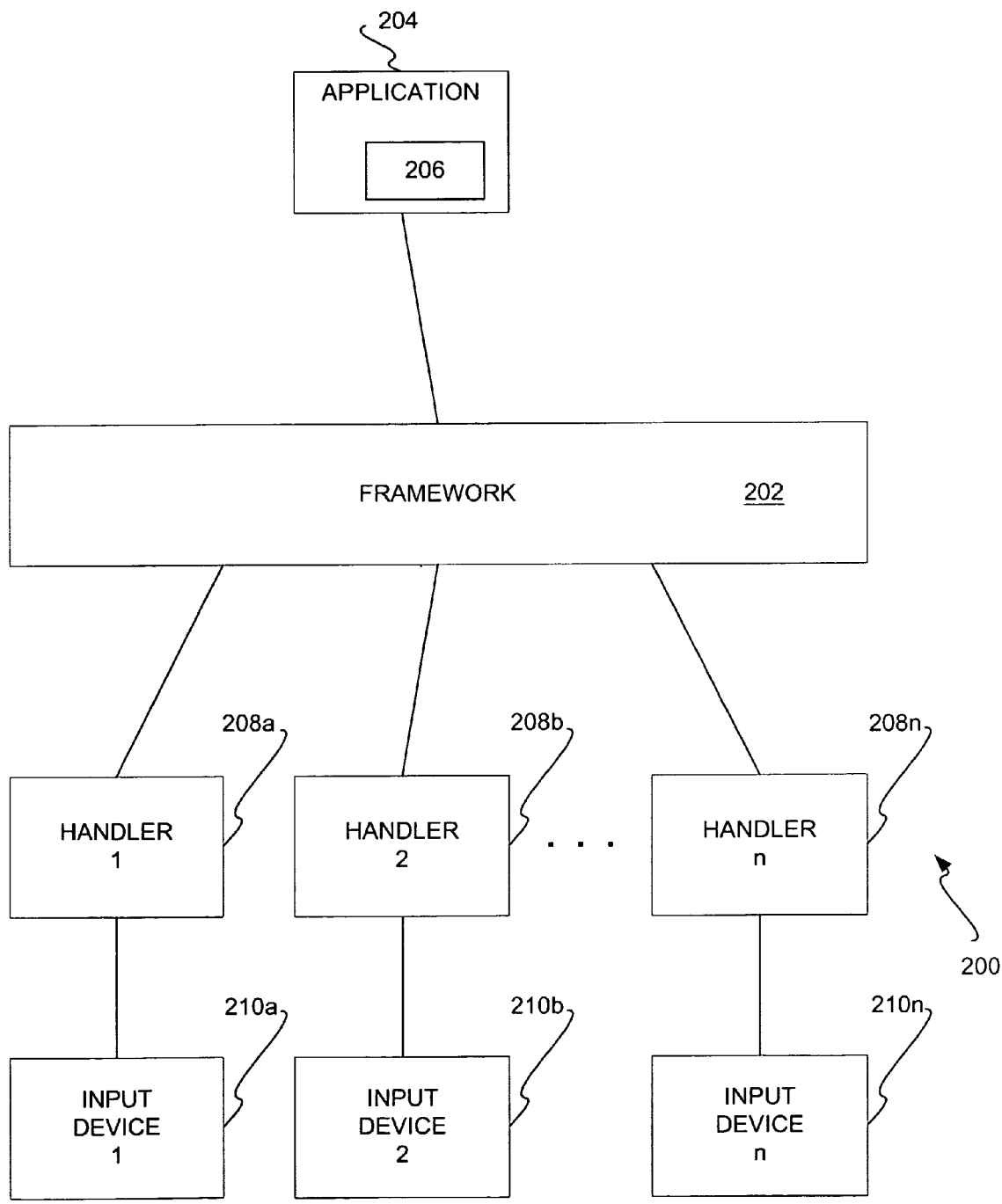

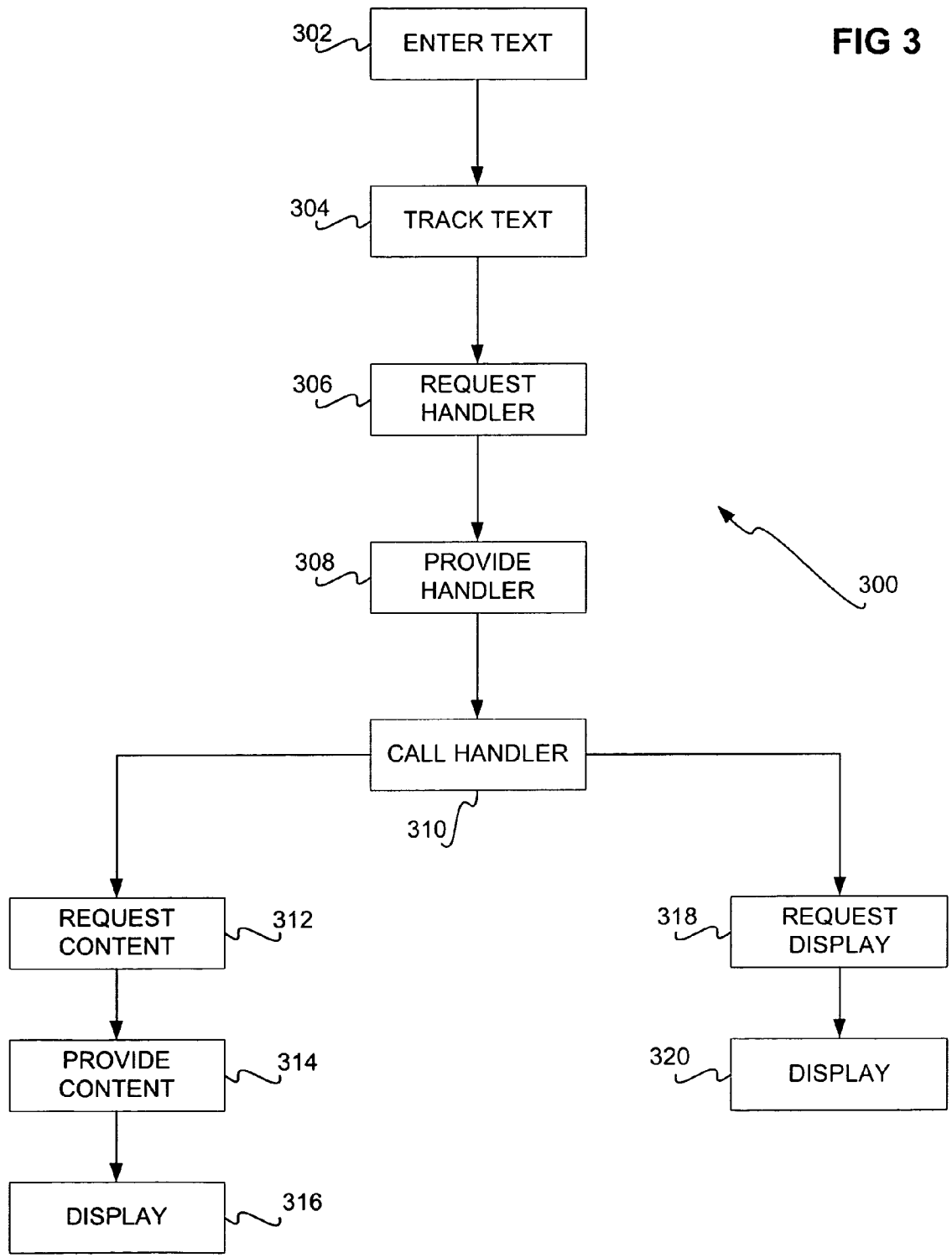

MULTI-MODAL TEXT EDITING CORRECTION

FIELD OF THE INVENTION

This invention relates generally to applications having documents of primarily text and input (and other) devices for inserting and modifying text within such documents, and more particularly to a text editing correction environment for such applications and such input (and other) devices to interact with one another for the correction of text within the documents of the applications.

BACKGROUND OF THE INVENTION

A common application today is the entering, editing and manipulation of text. Application programs that perform such text operation include word processors, text editors, and even spreadsheets and presentation programs. For example, a word processor allows a user to enter text to prepare documents such as letters, reports, memos, etc.

While the keyboard has historically been the standard input device by which text input is performed into these type of application programs, it is currently being augmented and/or replaced by other types of input devices. For example, touch-sensitive pads can be "written" on with a stylus, such that a handwriting recognition program can be used to input the resulting characters into a program. As another example, voice-recognition programs, which work in conjunction with microphones attached to computers, also are becoming more popular. Especially for non-English language users, these non-keyboard type devices are popular for initially inputting text into programs, such that they can then be edited by the same device, or other devices like the keyboard.

A difficulty with the use of such input devices to input text into such programs is that there is no common mechanism by which to manage the text that these devices produce. In particular, a single document may have text entered thereinto by a number of different input devices. For example, parts of the document may have been entered in by the keyboard, other parts of the document via handwriting recognition, and still other parts via speech recognition. The prior art does not provide for, however, text editing correction for such multi-modal environments. For example, once the text has been entered into the document, the prior art does not track which of the input devices was responsible for entry of the text. Thus, when it comes time to correct the text, the prior art usually relies on a default input device, such as the keyboard, by which corrections are to be made, which is an inconvenient solution at best, and does not leverage any source information for the text, such as the graphical data on which handwriting recognition was performed, the voice data on which speech recognition was performed, etc.

For these and other reasons, therefore, there is a need for the present invention.

SUMMARY OF THE INVENTION

The invention relates to multi-modal text editing correction. In one embodiment, a system provides for a multi-modal text editing correction environment, where the system includes an application program, input device handlers, and a common text framework. The program owns a document, while each handler has a corresponding input device and is capable of entering text into the document, for example, via the common text framework. Each handler also has a method callable by the program to request: that the handler return correction content for display by the application; and/or that the handler display a correction interface. The common text framework includes a mechanism to track entry of text into the document by handler, and also includes a correction interface callable by the application program to determine the handler responsible for entering a particular range of text into the document.

Embodiments of the invention provide for advantages not found within the prior art. The common text framework tracks which handlers have entered in which text into the document. An application can then call a method to either ask for correction content for the particular range of text (such that the application most likely is to manage corrections to the text itself), ask the handler to display a correction interface (such that the handler most likely is to manage the text corrections), or both. Thus, embodiments of the invention provide for a multi-modal text editing correction environment in which the handlers responsible for entering in text into the document are tracked by the text they have entered, which can later be leveraged to make for optimal corrections to the text. For example, the graphical data on which handwriting recognition was performed and/or the voice data on which speech recognition was performed can later by reinterpreted or reexamined during text correction, since the common text framework tracks which parts of the document were entered by speech recognition and/or handwriting recognition.

The invention includes computer-implemented methods, machine-readable media, computerized systems, and computers of varying scopes. Other aspects, embodiments and advantages of the invention, beyond those described here, will become apparent by reading the detailed description and with reference to the drawings.

BRIEF DESCRIPTION OF THE DRAWINGS

FIG. 2 is a diagram of a system according to an embodiment of the invention; and, FIG. 3 is a flowchart of a method according to an embodiment of the invention.

DETAILED DESCRIPTION OF THE INVENTION

Figure 1:
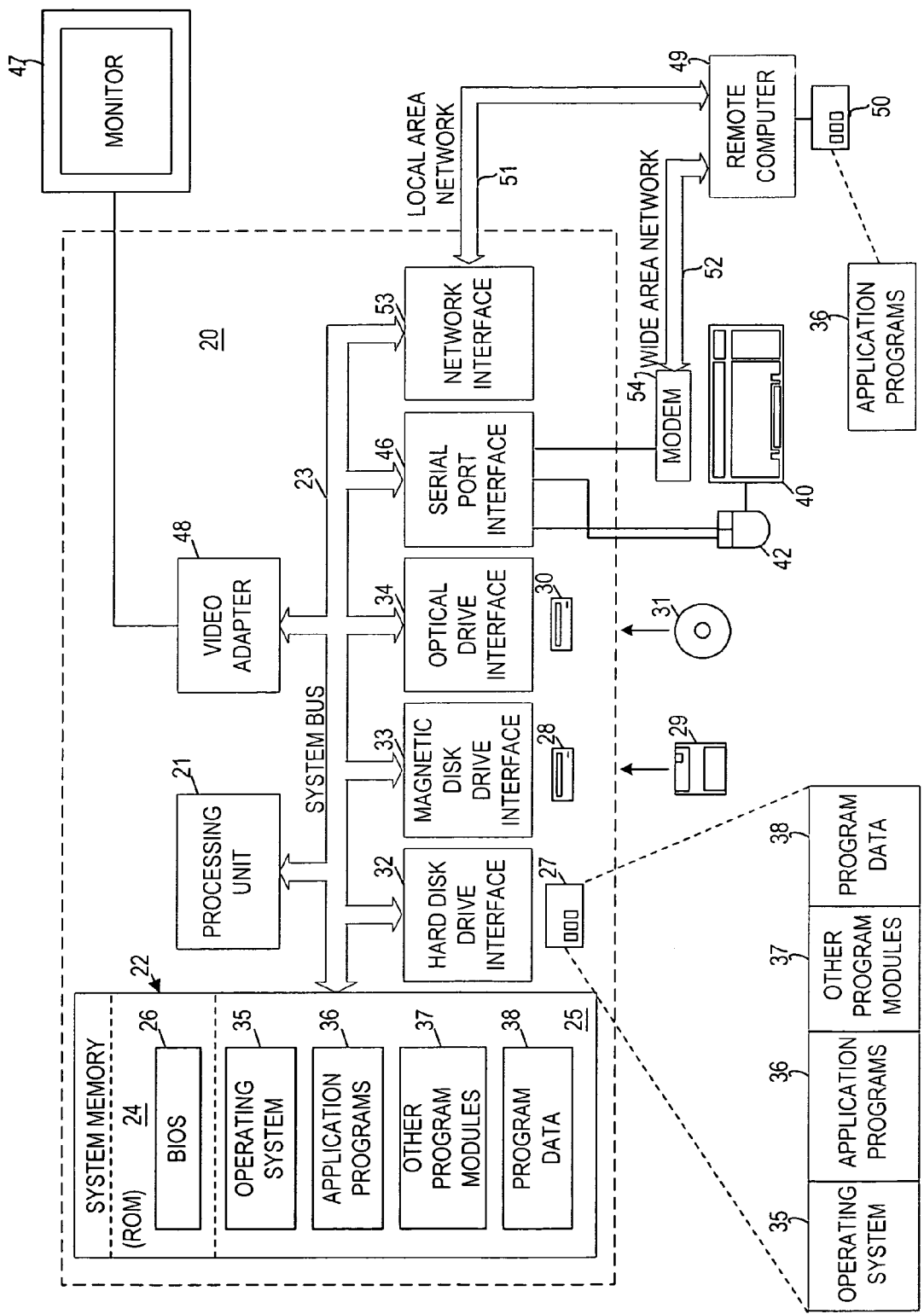
FIG. 1 is a diagram of an operating environment in conjunction with which embodiments of the invention can be practiced.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

System

In this section of the detailed description, a system according to an embodiment of the invention in accordance with one embodiment thereof is presented. In the diagram of FIG. 2, the system 200 includes a common text framework 202, that provides for interactivity among an application program 204, and input device handlers 208a, 208b, ..., 208n. The application program 204 is a program that has a document of primarily text. Such programs include, for example, word processors, text editors, as well as spreadsheets, presentation managers, etc.; the invention is not so limited. The application program 204 has a corresponding document 206, and exposes its documents to the framework as an abstraction to the framework 202, as opposed to, for example, the internal representation of the document 206.

Input device handlers 208a, 208b, ..., 208n are the handlers, also referred to as processors or drivers, for corresponding input devices 210a, 210b, ..., 210n. Such input devices include, for example, keyboards, touch pads on which text is "written" using a stylus and then handwriting-recognized by their corresponding handlers, microphones into which words are spoken and then voice-recognized by their corresponding handlers, etc.; the invention is not so limited. Input device handlers 208a, 208b, ..., 208n access the abstractions of the documents and insert additional text into the documents via the framework 202.

It is noted that in one embodiment, device drivers are a level below what the framework is concerned with. That is, drivers still exist for speech or other input devices or other devices. The handler lies above the device driver. Thus, in this embodiment, the driver resolves a given hardware input into a kind of text or object, and the handler uses this text or object in conjunction with the framework to insert the text or object into the document.

Thus, the framework 202 is a mechanism by which application programs and input devices, through their handlers, can interact with one another on a common basis, as is more particularly described in subsequent sections of the detailed description. It is noted that, as shown in FIG. 2, the framework 202 provides for bi-directionality and multi-modality—input device handlers, for example, can both retrieve text from abstractions of documents of the application programs as well as inject text into the documents, and multiple input devices can inject and edit text into the documents of the application programs. It is also noted that the framework 202 can the only manner by which input device handlers can interact with applications—that is, except via the framework 202, no interaction therebetween may be permitted, such as direct interaction without the use of the framework 202. However, it is noted that the invention itself is not so limited, and is inclusive of direct interaction as well. Thus, as the particulars of the common text framework are described in the subsequent sections of the detailed description—that is, particularly its various interfaces—it is noted that this limitation is desirably maintained in one embodiment.

The common text framework 202 of FIG. 2 has a mechanism, such as a computer program that is a part of the framework 202, or a software object in the context of an object-oriented programming environment as known within the art, that tracks the entry of text into a document of an application by a handler, such that each handler is associated with text it enters into the document. In one embodiment, handlers enter text into the document via an abstraction thereof as exposed by the application through the framework 202. Specifically, handlers enter text into determined ranges of the document, where a range is specified by two positions within the document, a beginning position, and an ending position. In such an embodiment, the mechanism of the framework 202 attaches a property to each contiguous range of text as the text is entered by a handler, to identify the handler as that which entered the text into the range of the document.

A property is generally any type of data that is attached to a specific range by an input device handler, and which can then be persisted by the application owning the document of which the text is a part. Persistence may be, for example, a user-selectable option within an application program. It is noted that to the application program, the properties appear as data attached to ranges within the text. That is, the data may or may not appear as meaningless to the application program itself, and is likely to be the former, not the latter. The property attached by the mechanism of the framework 202 is only one type of property that can be attached to ranges of text. Where the properties are persisted by the application, therefore, the framework 202 is able to identify the handler responsible for entering in a particular range of text even after the document has been exited and re-opened.

The framework 202 also has a correction interface callable by the application programs, so that an application program is able to determine the handler responsible for entering in specified text into the document of the application. This works in conjunction with the mechanism of the framework 202 that has already been described. Thus, the mechanism of the framework 202 maintains this handler-tracking information, and provides it to the application programs as requested thereby. For example, in one embodiment, the application program provides the framework 202 with a range denoted by two positions within the document, and in return the framework 202, via the correction interface, provides the handler(s) that were responsible for entering text into this range. This information can then be used by the application program as is now described.

Each of the handlers has in one embodiment a method that is callable by any application program, whereby an application program is able to request either or both of the following. First, the program can request that the handler return correction content for display by the application program itself, for text specified by the application program when calling the method, where the text was entered into the document by the handler being called. Thus, the application program receives the information as to which handler is responsible for particular text via calling the correction interface of the framework 202, and then calls the method of this handler. As with the correction interface, the application program in one embodiment specifies text when calling the method of a handler by a range identified by two positions within the document of the application program.

The invention is not limited to a particular type of correction content returned by the handler to the application program. In one embodiment, however, the correction content includes other guesses that the handler had for the text inserted into the document. For example, in the context of voice recognition, the handler processes speech data via voice recognition, and comes up with a best match as to what the user meant to say as captured by the speech data. As can be appreciated by those of ordinary skill within the art, the handler may typically have a number of matches for the speech data in varying degrees of probability, where usually the handler inserts as the text into the document the best match. However, there may be a number of matches that, for example, exceed a predetermined threshold of likeliness, such that all of these matches are returned by the handler to the application program as correction content for a specified range of text.

When the handler returns this correction content to the application program, it is desirably done so that the application program can manage corrections to the text by itself, for example, within its own correction-oriented interface. However, the application program can also call the method to request something else, that the handler itself display a correction interface thereof, for correction of the text specified by the application program (e.g., via a range identified by two positions) that was originally entered into the document by the handler. For this, conversely, the handler desirably manages corrections to the text, using its own correction interface, instead of the application program managing corrections. Furthermore, in one embodiment, the application program can initially request that correction content be returned to it, so that it can initially manage corrections to the text, while giving the user the option to also proceed to the correction interface of the handler itself. If the user chooses this option, the application program then requests the handler to take over correction. This can be done, for example, where the correction interface of the application is a basic and simple interface, such that simple corrections can be made therein, while the correction interface of the handler is more sophisticated and particular to the handler itself, such that complex changes can be made therein.

A non-restrictive and non-limiting example of the manner by which the system of FIG. 2 operates is now presented. Via the framework 202, a speech recognition handler enters into the abstraction of a document exposed by an application program the word "DOS", as in the computer-oriented acronym for disk operating system. The handler may have had a 45% probability that this was what the user meant to insert as text into the document. The handler may have also had a 40% probability that the word "dog" was what the user meant to insert as text into the document. The handler inserted the word "DOS" into the document at a particular range. The framework 202 attached a property to this particular range identifying the handler as that which was originally responsible for entering in this text into the document.

Then, at some point the user of the application program decides to correct the text that he or she has entered into the document. When the application program reaches the range in which the word "DOS" is specified, it calls the framework 202 to determine the handler responsible for entry of this text into the document. The framework 202 returns the identity of the handler responsible, and the application program calls a method of the handler, requesting correction content for the word "DOS". The handler returns the words "DOS" and "dog" as the two words that it believes are most likely what the user meant to insert as text at this range. The application program then manages text correction itself, for example, by giving the user the choice of substituting the word "dog" for "DOS" in the text.

Alternatively, the application program calls the method of the handler, requesting that the handler show its correction interface to the user. In such instance, the handler then displays its correction interface, and most likely also shows the words "dog" for "DOS" in the text, giving the user the choice of substituting the former for the latter word. If the user makes this choice, then in this latter instance the handler likely manages the text correction itself, deleting the word "DOS" from the text at the range, and inserting in its place the word "dog", via the common text framework 202.

Methods

In this section of the detailed description, methods according to varying embodiments of the invention are shown. The methods can in some embodiments be computer-implemented. A computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description. The invention is not so limited, however.

Referring to FIG. 3, a flowchart of a method 300 is shown. In 302, a handler for an input device enters text into a document owned by an application. For example, in one embodiment, entry of text can be via a common text framework governing interaction between the application and the handler, where the application exposes its document as an abstraction. The handler may have a specified range within the abstraction of the document, such that it injects text into the document at the specified range. In 304, the common text framework tracks the text entered into the document by the handler. For example, in one embodiment, a mechanism of the framework attaches a property to the range of the document corresponding to and in which the text was entered, where the property identifies the handler for the input device.

Once the application desires to have corrections made to its document, in 306 it requests from the common text framework the identity of a particular handler responsible for entering specified text into its document. For example, in one embodiment, the application requests the identity of a particular handler(s) responsible for entering text into its document at a specified range. In 308, the common text framework returns the identity of the particular handler(s) responsible for entering in the specified text, in response to the request made by the application in 306. In one embodiment, the identity returned is a pointer to the particular handler, as can be appreciated by those of ordinary skill within the art.

In 310, after the application has the identity of the particular handler (while there can be more than one handler, for sake of description of the method of FIG. 3, only one is assumed for a range, although the invention itself is not so limited to this simplified description, as can be appreciated by those of ordinary skill within the art), the application calls a method of the handler. Either the path specified by 312, 314 and 316 of FIG. 3 can be the subject matter of the request of the call to the method, or the path specified by 318 and 320 of FIG. 3. Furthermore, in one embodiment, one of the paths is first requested, and then the application makes another call to the handler to request the other path.

The path specified by 312, 314 and 316 is first described. In 312, in the call to the method of the handler, the application program requests that the handler return correction content for the specified text, which may be, as has been described, specified by a particular range within the document of the program. The correction content may be, for example, alternative choices for the text within the range that the handler ultimately decided upon to insert into the range, as described in the previous section of the detailed description. In 314, the handler returns this content, and in 316, the application displays the content. For example, in one embodiment, the application displays the content to the user, so that the user is able to select whether one of the alternative choices for the specified text should be substituted therefor, such that the application itself manages corrections to the specified text.

The path specified by 318 and 320 is now described. In 318, in the call to the method of the handler, the application program requests that the handler display its own correction interface for correction of the specified text. The handler then accomplishes this in 320, such that the handler itself manages corrections to the specified text. For example, where the user requests that the handler make a correction, the handler may then via the common text framework of one embodiment of the invention request that the original text in the appropriate range be deleted, and the corrected text be inserted therein. The invention is not so limited, however.

CONCLUSION

A common text framework by which applications and handlers for input devices can interact. It is noted that in one embodiment, each of the applications and input device handlers can be implemented as a computer program, executable on a computer as described previously in conjunction with FIG. 1. Furthermore, in one embodiment, a machine-readable medium, such as a memory, a removable storage like a CD-ROM or a floppy disk, a fixed storage like a hard disk drive, etc., has instructions stored thereon for execution by a processor, such as the computer of FIG. 1, to implement a computer program to provide the common text framework. Embodiments of the invention can also encompass systems in accordance with the description of the common text framework provided in the detailed description.

It is also noted that, although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A computerized system providing a multi-modal text editing correction environment comprising:
    an application program, owning a document;
    a plurality of input device handlers, each handler having a corresponding input device and capable of entering text into the document, each handler also having a method callable by the application program to request at least one of:
        that the handler return correction content for display by the application program itself for text specified by the application program that was entered into the document by the handler, and
        that the handler display a correction interface thereof for correction of the text specified by the application program that was entered into the document by the handler;
    a common text framework comprising:
    a mechanism to track initial entry of each specified portion of text into the document by each handler, such that each handler is permanently associated with the specified portion of text it enters into the document, wherein the mechanism to track entry of text into the document by each handler associates each contiguous range of text entered into the document by a single handler to the single handler and attaches a property to each contiguous range of text identifying the single handler for the contiguous range of text; and,
    a correction interface callable by the application program after initial entry of the specified text portion into the document, to determine a responsible handler that initially entered the specified text portion into the document, wherein the correction interface determines the responsible handler based on the tracking mechanism, and calls the responsible handler for correction.

2. The system of claim 1, wherein the application program calls the method of an input device to request at least that the responsible handler return the correction content such that the application program manages correction of the specified text itself.

3. The system of claim 1, wherein the application program calls the method of the responsible handler to request at least that the responsible handler display a correction interface thereof such that the responsible handler manages correction of the specified text itself.

4. A machine-readable medium having instructions stored thereon for execution by a processor to implement a computer program providing a common text framework for at least multi-modal text editing corrections comprising:
    a mechanism to track initial entry of text into a document owned by an application program by each of a plurality of input device handlers, such that each input device handler is permanently associated with text it enters into the document, wherein the mechanism to track entry of text into the document by each handler associates each contiguous range of text entered into the document by a single handler to the single handler and attaches a property to each contiguous range of text identifying the single handler for the contiguous range of text; and,
    a correction interface callable by the application program after initial text entry to determine a responsible input device handler responsible for initially entering specified text into the document and for calling upon the responsible input device handler to assist in correction of the specified text.

5. A computer-implemented method comprising:
    entering text into a document owned by an application by a handler for an input device, via a common text framework governing interaction between the application and the handler for the input device, such that the application exposes the document as an abstraction;
    tracking of the initial entry of text entered into the document by the handler for the input device by the common text framework, wherein tracking of the text entered into the document by the handler for the input device by the common text framework comprises permanently attaching a property to a range of the document corresponding to the text entered, the property identifying the handler for the input device;

requesting of the common text framework by the application of an identity of a particular handler that was responsible for initially entering specified text into the document;

returning by the common text framework to the application the identity of the particular handler that was responsible for initially entering the specified text into the document; and requesting by the application of correction information from the particular handler.

6. The method of claim 5, wherein requesting the common text framework comprises requesting the identity of the particular handler responsible for entering specified text into a specified range of the document.

7. The method of claim 5, further comprising:

requesting by the application of the particular handler to return correction content for the specified text for display by the application itself; and, returning by the particular handler to the application the correction content for the specified text.

8. The method of claim 7, further comprising displaying by the application of the correction content.

9. The method of claim 7, wherein the application manages corrections to the specified text itself.

10. The method of claim 7, further comprising:

requesting by the application of the particular handler that the particular handler display a correction interface thereof for correction of the specified text; and, displaying by the particular handler of the correction interface.

11. The method of claim 10, wherein the particular handler manages corrections to the specified text itself.

12. The method of claim 5, further comprising:

requesting by the application of the particular handler that the particular handler display a correction interface thereof for correction of the specified text; and, displaying by the particular handler of the correction interface.

13. The method of claim 12, wherein the particular handler manages corrections to the specified text itself.

14. A computer-implemented method comprising:

entering text into a document owned by an application by a handler for an input device, via a common text framework governing interaction between the application and the handler for the input device, such that the application exposes the document as an abstraction;

tracking of the text entered during initial text processing into the document by the handler for the input device by the common text framework, wherein tracking of the text includes associating each contiguous range of text entered into the document by a single handler to the single handler and permanently attaching a property to each contiguous range of text identifying the single handler for the contiguous range of text;

requesting of the common text framework by the application of an identity of a particular handler responsible for entering specified text during initial text processing into the document;

returning by the common text framework to the application the identity of the particular handler that was responsible for entering the specified text into the document during initial text processing; and, requesting by the application program, after initial text processing and after returning of the identity of the particular handler, of the particular handler at least one of:

that the handler return correction content for display by the application itself for the specified text; and, that the handler display a correction interface thereof for correction of the specified text.

* * * * *